United States Patent
Namba et al.

(10) Patent No.: US 9,205,677 B2
(45) Date of Patent: Dec. 8, 2015

(54) INKJET RECORDING METHOD AND INKJET RECORDING DEVICE

(71) Applicants: Michihiko Namba, Kanagawa (JP); Shosuke Aoai, Kanagawa (JP); Tsutomu Maekawa, Kanagawa (JP)

(72) Inventors: Michihiko Namba, Kanagawa (JP); Shosuke Aoai, Kanagawa (JP); Tsutomu Maekawa, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/572,900

(22) Filed: Dec. 17, 2014

(65) Prior Publication Data

US 2015/0174920 A1 Jun. 25, 2015

(30) Foreign Application Priority Data

Dec. 19, 2013 (JP) ................................. 2013-262191
Oct. 29, 2014 (JP) ................................. 2014-220165

(51) Int. Cl.

| | |
|---|---|
| *B41J 2/01* | (2006.01) |
| *B41J 11/00* | (2006.01) |
| *B41J 2/21* | (2006.01) |
| *B41M 5/00* | (2006.01) |
| *C09D 11/30* | (2014.01) |
| *C09D 11/326* | (2014.01) |
| *B41M 5/52* | (2006.01) |
| *C09D 11/322* | (2014.01) |

(52) U.S. Cl.
CPC .............. *B41J 11/002* (2013.01); *B41J 2/2107* (2013.01); *B41J 11/0015* (2013.01); *B41M 5/0017* (2013.01); *C09D 11/30* (2013.01); *C09D 11/326* (2013.01); *B41J 2/01* (2013.01); *B41M 5/5245* (2013.01); *C09D 11/322* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................. 347/100, 95, 96, 102, 103, 88, 99; 106/31.13, 31.6, 31.27; 523/160, 161
See application file for complete search history.

(56) References Cited

U.S. PATENT DOCUMENTS

| | | | |
|---|---|---|---|
| 2005/0168552 A1* | 8/2005 | Arita et al. ..................... | 347/100 |
| 2009/0186162 A1 | 7/2009 | Namba et al. | |
| 2010/0227067 A1 | 9/2010 | Namba et al. | |
| 2010/0279035 A1 | 11/2010 | Namba et al. | |
| 2010/0295891 A1* | 11/2010 | Goto et al. ..................... | 347/21 |
| 2011/0216123 A1 | 9/2011 | Tamai et al. | |
| 2011/0234679 A1* | 9/2011 | Saito ............................. | 347/20 |
| 2011/0279517 A1* | 11/2011 | Katsuragi ..................... | 347/21 |
| 2011/0310166 A1 | 12/2011 | Namba et al. | |
| 2012/0236066 A1 | 9/2012 | Tamai et al. | |
| 2013/0194345 A1 | 8/2013 | Tamai et al. | |
| 2013/0201252 A1 | 8/2013 | Namba | |
| 2014/0253631 A1 | 9/2014 | Namba et al. | |

FOREIGN PATENT DOCUMENTS

| | | |
|---|---|---|
| JP | 5-186704 | 7/1993 |
| JP | 8-003498 | 1/1996 |
| JP | 2000-053897 | 2/2000 |
| JP | 2001-139849 | 5/2001 |
| JP | 2005-532437 | 10/2005 |
| JP | 2006-009005 | 1/2006 |
| JP | 2006-231823 | 9/2006 |
| JP | 2011-111605 | 6/2011 |
| JP | 2012-187840 | 10/2012 |
| WO | WO2004/003090 A1 | 1/2004 |
| WO | WO 2009/082000 A1 | 7/2009 |
| WO | WO 2009/091079 A1 | 7/2009 |

OTHER PUBLICATIONS

Japanese official action dated Dec. 20, 2011 in corresponding Japanese Patent Application No. 2008-98345.

* cited by examiner

Primary Examiner — Manish S Shah
(74) Attorney, Agent, or Firm — Cooper & Dunham LLP

(57) ABSTRACT

An inkjet recording method includes imparting a pre-processing fluid to a coated layer provided on at least one surface of the substrate of a recording medium, drying the pre-processing fluid, and forming an image on the recording medium by ejecting an aqueous ink thereon. The pre-processing fluid contains a hydrosoluble organic solvent, a flocculating agent formed of a quaternary salt of an adduct of alkyl amine·epichlorohydrine represented by the following chemical formula 1, and a nonion-based surfactant represented by the following chemical formula 2, Chemical formula 1

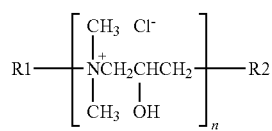

(1)

Chemical formula 2

$$R-O-(CH_2CH_2O)x-(CH_2C(CH_3)CH_2O)y-H \qquad (2)$$

wherein the aqueous ink comprises a colorant, a hydrosoluble organic solvent, and a fluorine-containing surfactant represented by the following chemical formula 3 or 4:

$$C_6F_{13}-CH_2CH_2O(CH_2CH_2O)_nH \qquad (3)$$

Chemical formula 3

$$C_nF_{2n+1}-CH_2CH(OH)CH_2-O-(CH_2CH_2O)_a-Y \qquad (4)$$

Chemical formula 4.

5 Claims, 1 Drawing Sheet

INKJET RECORDING METHOD AND INKJET RECORDING DEVICE

CROSS-REFERENCE TO RELATED APPLICATIONS

This patent application is based on and claims priority pursuant to 35 U.S.C. §119(a) to Japanese Patent Application Nos. 2013-262191 and 2014-220165, filed on Dec. 19, 2013 and Oct. 29, 2014, respectively, in the Japan Patent Office, the entire disclosures of which are hereby incorporated by reference herein.

BACKGROUND

1. Technical Field

The present invention relates to a recording medium and an image recording set.

2. Background Art

In image forming methods using aqueous inkjet inks, recording media having a coated layer such as offset printing media have been used to acquire the image quality with gloss. However, unlike recording media having no coated layer, aqueous ink does not easily penetrate into the recording media so that droplets are unified on the surfaces of the recording media, which leads to occurrence of beading at interfaces of different color inks or an ink and the recording medium. In addition, the surface of the image on a recording medium glitters like a metal when it is viewed from a particular angle, which is a drawback referred to as bronzing.

In an attempt to solve this, a bronzing resistance agent is added to an aqueous ink used to form images on a recording medium by jetting.

Also, to reduce the impact of bronzing of black ink, selecting a thin black ink or an extremely thin black ink depending on pixel values is proposed for image formation.

Moreover, a cyan dye ink having a particular structure is used to reduce the level of bronzing.

SUMMARY

The present invention provides an improved inkjet recording method including imparting a pre-processing fluid to a coated layer provided on at least one surface of the substrate of a recording medium, drying the pre-processing fluid, and forming an image on the recording medium by ejecting an aqueous ink thereon, wherein the pre-processing fluid contains a hydrosoluble organic solvent, a flocculating agent formed of a quaternary salt of an adduct of alkyl amine.epichlorohydrine represented by the following chemical formula 1, and a nonion-based surfactant represented by the following chemical formula 2, Chemical formula 1

$$R1-\left[\begin{array}{cc} CH_3 & Cl^- \\ | \,+ & \\ NCH_2CHCH_2 \\ | & | \\ CH_3 & OH \end{array}\right]_n - R2 \qquad (1)$$

where R1 and R2 each, independently represent triaryl amine groups or diethylamine groups, and n represents an integer of from 4 to 40, $$R-O-(CH_2CH_2O)x\text{-}(CH_2C(CH_3)CH_2O)y\text{-}H \qquad (2)$$

Chemical formula 2 where x represents 0 or an integer of from 1 to 5, y represents an integer of from 10 to 15, and R represents $C_mH_{2m+1}$, where m represents an integer of from 1 to 20, wherein the aqueous ink contains a colorant, a hydrosoluble organic solvent, and a fluorine-containing surfactant represented by the following chemical formula 3 or 4:

$$C_6F_{13}-CH_2CH_2O(CH_2CH_2O)_nH \qquad (3)$$

Chemical formula 3 where n represents an integer of from 1 to 40, $$C_nF_{2n+1}-CH_2CH(OH)CH_2-O-(CH_2CH_2O)_a-Y \qquad (4)$$

Chemical formula 4 where Y represents $C_nF_{2n+1}$ or $CH_2CH(OH)CH_2-C_nF_{2n+1}$, n represents an integer of from 4 to 6, and a represents an integer of from 4 to 14.

As another aspect of the present invention, an inkjet recording device is provided which includes a container to accommodate a pre-processing fluid, a drying device to dry the pre-processing fluid after imparting the pre-processing fluid to a recording medium, and an ink container or ink cartridge to accommodate ink for inkjet recording, and an inkjet recording head to eject droplets of the ink formed by energy action or a recording unit comprising the inkjet recording head, wherein the pre-processing fluid contains a hydrosoluble organic solvent, a flocculating agent formed of a quaternary salt of an adduct of alkyl amine.epichlorohydrine represented by the following chemical formula 1, and a nonion-based surfactant represented by the following chemical formula 2, Chemical formula 1

$$R1-\left[\begin{array}{cc} CH_3 & Cl^- \\ | \,+ & \\ NCH_2CHCH_2 \\ | & | \\ CH_3 & OH \end{array}\right]_n - R2 \qquad (1)$$

where R1 and R2 each, independently represent triaryl amine groups or diethylamine groups, and n represents an integer of from 4 to 40, $$R-O-(CH_2CH_2O)x\text{-}(CH_2C(CH_3)CH_2O)y\text{-}H \qquad (2)$$

Chemical formula 2 where x represents 0 or an integer of from 1 to 5, y represents an integer of from 10 to 15, and R represents $C_mH_{2m+1}$, where m represents an integer of from 1 to 20, wherein the aqueous ink comprises a colorant, a hydrosoluble organic solvent, and a fluorine-containing surfactant represented by the following chemical formula 3 or 4:

$$C_6F_{13}-CH_2CH_2O(CH_2CH_2O)_nH \qquad (3)$$

Chemical formula 3 where n represents an integer of from 1 to 40, $$C_nF_{2n+1}-CH_2CH(OH)CH_2-O-(CH_2CH_2O)_a-Y \qquad (4)$$

Chemical formula 4 where Y represents $C_nF_{2n+1}$ or $CH_2CH(OH)CH_2-C_nF_{2n+1}$, n represents an integer of from 4 to 6, and a represents an integer of from 4 to 14.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
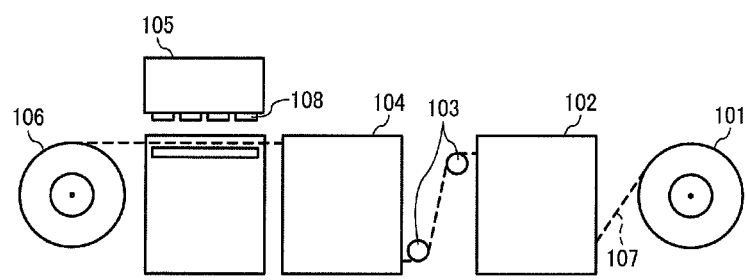
FIG. 1 is a schematic view illustrating the entire configuration of the ink jet recording device according to an embodiment of the present disclosure.

According to the present invention, an inkjet recording method and an inkjet recording device are provided to reduce non-uniformity of images, provide excellent gloss, and improve the level of bronzing, which is an issue for improvement of the image quality.

As a result of an investigation made by the present inventors, it was found that, in image formation methods including a pre-processing fluid imparting process and a pre-processing fluid drying process, the level of bronzing of the image portion printed after the pre-processing was lowered by using a pre-processing fluid to flocculate pigments in ink which contains a quaternary salt of an adduct of alkyl amine.epichlorohydrine and a surfactant having a particular structure. Since the surfactant contained in the pre-processing fluid is different from the surfactant contained in the ink, the leveling property of the ink on the coated surface of the pre-processing fluid is secured. The leveling property is demonstrated in the process of ink permeating into a recording medium so that inferentially the leveling of the image portion is retained, thereby preventing degradation of the image gloss and the level of bronzing.

That is, the present invention relates to the inkjet recording method described in the following (1).

(1) An inkjet recording method including imparting a pre-processing fluid to a coated layer provided on at least one surface of the substrate of a recording medium, drying the pre-processing fluid, and forming an image on the recording medium by ejecting an aqueous ink thereon, wherein the pre-processing fluid contains a hydrosoluble organic solvent, a flocculating agent formed of a quaternary salt of an adduct of alkyl amine.epichlorohydrine represented by the following chemical formula 1, and a nonion-based surfactant represented by the following chemical formula 2, Chemical formula 1

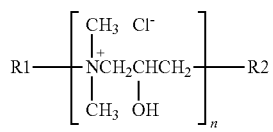

where R1 and R2 each, independently represent triaryl amine groups or diethylamine groups, and n represents an integer of from 4 to 40, $$R—O—(CH_2CH_2O)x-(CH_2C(CH_3)CH_2O)y-H \quad (2)$$

Chemical formula 2 where x represents 0 or an integer of from 1 to 5, y represents an integer of from 10 to 15, and R represents $C_mH_{2m+1}$, where m represents an integer of from 1 to 20, wherein the aqueous ink contains a colorant, a hydrosoluble organic solvent, and a fluorine-containing surfactant represented by the following chemical formula 3 or 4:

$$C_6F_{13}—CH_2CH_2O(CH_2CH_2O)_nH \quad (3)$$

Chemical formula 3 where n represents an integer of from 1 to 40, $$C_nF_{2n+1}—CH_2CH(OH)CH_2—O—(CH_2CH_2O)_a—Y \quad (4)$$

Chemical formula 4 where Y represents $C_nF_{2n+1}$ or $CH_2CH(OH)CH_2—C_nF_{2n+1}$, "n" represents an integer of from 4 to 6, and "a" represents an integer of from 4 to 14.

Embodiments of the present disclosure are described below but are not limiting the present invention.

Pre-Processing Fluid

The components contained in the pre-processing fluid are described below.

Flocculating Agent Formed of Quaternary Salt of Adduct of Alkyl Amine.Epichlorohydrine The pre-processing fluid for use in the present disclosure is a quaternary salt of an adduct of alkyl amine.epichlorohydrine. As the quaternary salt of an adduct of alkyl amine.epichlorohydrine, a quaternary salt of an adduct of alkyl amine.epichlorohydrine formed by polymerizing monomers containing an amine and a epihalohydrine.

The quaternary salt of an adduct of alkyl amine.epichlorohydrine polymerized from these monomers has hydroxyl groups, ammonium cation, etc. in its main chain. In addition, by isolating halogen anions in an aqueous solution, the salt inferentially boosts the buffer action or the functionality of flocculating pigments when contacting inks.

A specific example of the quaternary salt of an adduct of alkyl amine.epichlorohydrine is the compound represented by the following chemical formula 1.

Chemical formula 1

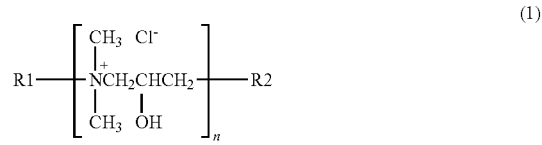

where R1 and R2 each, independently represent alkyl amine groups and n represents an integer of from 4 to 40 and preferably from 13 to 35.

The weight average molecular weight of the quaternary salt of an adduct of alkyl amine.epichlorohydrine differs depending on the kind of copolymers. In the case of a copolymer of polyamine and epihalohydrine preferably ranges from 500 to 100,000, more preferably from 500 to 5,000, and furthermore preferably from 2,000 to 5,000.

When the weight average molecular weight is within the range, an aqueous solution form is possible, which can be suitably used as the pre-processing fluid.

Quaternary Salt of Adduct of Alkyl Amine.Epichlorohydrine and Surfactant

The pre-processing fluid contains both of the quaternary salt of adduct of alkyl amine.epichlorohydrine and the surfactant.

In addition, the total amount of the quaternary salt of adduct of alkyl amine.epichlorohydrine in the pre-processing fluid preferably has a solids content ratio (solids content concentration) of from 10% by weight to 70% by weight, more preferably from 20% by weight to 60% by weight, and furthermore preferably from 40% by weight to 60% by weight.

The degradation of flocculation functionality after the drying process is suitably prevented by limiting the solids content ratio to at least 10% by weight. In addition, when the solids content ratio is maximally 70% by weight, good image quality is obtained.

Moreover, the surfactant is added to the pre-processing fluid in a range of from 0.001% by weight to 1% by weight and preferably from 0.003% by weight to 0.5% by weight. When the weight ratio is at least 0.001% by weight, the quaternary salt of an adduct of alkyl amine.epichlorohydrine contained in the pre-processing fluid is uniformly imparted onto a recording medium. When the weight ratio is maximally 1% by weight, it is possible to improve the storage reliability of the pre-processing fluid, which is preferable.

Surfactant

The pre-processing fluid of embodiments of the present disclosure reforms the wettability of a recording medium and improves the image density, coloring, and white spots (meaning blank left in the image portion of recorded matter) of recorded matter.

The pre-processing fluid contains the nonion-based surfactant represented by the following chemical formula 2 having a particular structure.

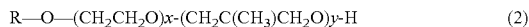

$$R—O—(CH_2CH_2O)x\text{-}(CH_2C(CH_3)CH_2O)y\text{-}H \quad (2)$$

Chemical formula 2 where x represents 0 or an integer of from 1 to 5, y represents an integer of from 10 to 15, and R represents $C_mH_{2m+1}$, where m represents an integer of from 1 to 20.

Optionally, it is possible to use a nonion-based surfactant, acetylene glycol-based surfactant, a fluorine-containing surfactant, a silicone-based surfactant, an anion-based surfactant, and a betaine-based surfactant in combination.

Specific examples of the nonion-based surfactants include, but are not limited to, polyoxyethylene alkyl ether, polyoxytheylene alkyl allyl ether, and polyoxyethylene alkyl phenyl ether.

Specific examples of the acretylene glycol surfactants include, but are not limited to, marketed products of Emulgen LS-106 (manufactured by Kao Corporation) and Surfynol® 104 and 104E (manufactured by Air Products and Chemical Inc.).

Surface Conditioner

The pre-processing fluid of embodiments of the present disclosure optionally contains the following surface conditioners. Such a surface conditioner is used to smooth the surface of an image when the pre-processing fluid and pigments in ink flocculate.

A preferable example of the surface conditioner is polyether-modified polydimethyl siloxane, which preferably has an involatile portion of 95% by weight or more. It is also preferable to add the conditioner to the pre-processing fluid in an amount of from 0.01% by weight to 0.50% by weight. If this addition is within this range, image gloss is suitably obtained. The surface conditioner can be any polyether-modified polydimethyl siloxane available on market. Specific examples thereof include, but are not limited to, BYK302, 307, 331, and 333 (all manufactured by BYK Chemie Japan) and particularly BYK 331 and 333 are preferable.

Specific examples of the hydrosoluble organic solvents for use in the pre-processing fluid of embodiments of the present disclosure include, but are not limited to, polyols, polyol alkyl ethers, polyol aryl ethers, nitrogen-containing heterocyclic compounds, amides, amines, sulfur-containing compounds, propylene carbonate, and ethylene carbonate.

The hydrosoluble organic solvents suitably used to maintain ejection and coating stability can be any hydrosoluble organic solvent having an equilibrium moisture content of 30% by weight or more and preferably 40% by weight or more at 23° C. and 80% humidity.

The hydrosoluble organic solvents can be polyols and specific examples thereof include, but are not limited to, 1,2,3-butane triol (boiling point: 175° C./air pressure during measuring: 33 hPa, equilibrium moisture content: 38% by weight), 1,2,4-butane triol (boiling point: 190° C. to 191° C./air pressure during measuring: 24 hPa, equilibrium moisture content: 41% by weight), glycerine (boiling point: 290° C., air pressure during measuring: 1 atom, equilibrium moisture content: 49% by weight), diglycerine (boiling point: 270° C./air pressure during measuring: 20 hPa, equilibrium moisture content: 38% by weight), triethylene glycol (boiling point: 285° C., air pressure during measuring: 1 atom, equilibrium moisture content: 39% by weight), tetraethylene glycol (boiling point: 324° C. to 330° C., air pressure during measuring: 1 atom, equilibrium moisture content: 37% by weight), diethylene glycol (boiling point: 245° C., air pressure during measuring: 1 atom, equilibrium moisture content: 43% by weight), and 1,3-butane diol (boiling point: 203° C. to 204° C., air pressure during measuring: 1 atom, equilibrium moisture content: 35% by weight).

Specific examples of the hydrosoluble organic solvents which are suitable in terms of the flocculation functionality of the pre-processing fluid include, but are not limited to, polyols, polyol alkyl ethers, polyol aryl ethers, nitrogen-containing heterocyclic compounds, amides, amines, sulfur-containing compounds, propylene carbonate, and ethylene carbonate, which have an equilibrium moisture content below 30% by weight at 23° C. and moisture 80%.

Specific examples of the polyol of the hydrosoluble organic solvents include, but are not limited to, dipropylene glycol (boiling point: 232° C.), 1,5-pentane diol (boiling point: 242° C.), 3-methyl-1,3-butane diol (boiling point: 203 p° C.), propylene glycol (boiling point: 187° C.), 2-methyl-2,4-pentane diol (boiling point: 197° C.), ethylene glycol (boiling point: 196° C. to 198° C.), tripropylene glycol (boiling point: 267° C.), hexylene glycol (boiling point: 197° C.), polyethylene glycol (viscostic liquid to solid), polypropylene glycol (boiling point: 187° C.), 1,6-hexane diol (boiling point: 253° C. to 260° C.), 1,2,6-hexane triol (boiling point: 178° C.), trimethylol ethane (solid; melting point: 199° C. to 201° C.), trimethylol propane (solid; melting point: 61° C.), and 1,2-pentane diol.

Specific examples of the polyol alkyl ethers include, but are not limited to, ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 197° C.), diethylene glycol monobutyl ether (boiling point: 231° C.), ethylene glycol mono-2-ethylhexyl ether (boiling point: 229° C.), and propylene glycol monoethyl ether (boiling point: 132° C.).

Specific examples of the polyol aryl ethers include, but are not limited to, ethylene glycol monophenyl ether (boiling point: 237° C.) and ethylene glycol monobenzyl ether.

Specific examples of the nitrogen-containing heterocyclic compounds include, but are not limited to, 2-pyrolidone (boiling point: 250° C., melting point: 25.5° C., 47% by weight to 48% by weight), N-methyl-2-pyrolidone (boiling point: 202° C.), 1,3-dimethyl-2-imidazolidinone (boiling point: 226° C.), ε-caprolactam (boiling point: 270° C.), and γ-butylolactone (boiling point: 204° C. to 205° C.).

Specific examples of the amides include, but are not limited to, formamide (boiling point: 210° C.), N-methyl formamide (boiling point: 199° C. to 201° C.), N,N-dimethylformamide (boiling point: 153° C.), and N,N-diethylformamide (boiling point: 176° C. to 177° C.).

Specific examples of the amines include, but are not limited to, monoethanol amine (boiling point: 170° C.), diethanol amine (boiling point: 268° C.), triethanol amine (boiling point: 360° C.), N,N-dimethyl monoethanol amine (boiling point: 139° C.), N-methyl diethanol amine (boiling point: 243° C.), N-methylethanol amine (boiling point: 159° C.), N-phenyl ethanol amine (boiling point: 282° C. to 287° C.), and 3-aminopropyl diethyl amine (boiling point: 169° C.).

Specific examples of the sulfur-containing compounds include, but are not limited to, dimethyl sulphoxide (boiling point: 139° C.), sulfolane (boiling point: 285° C.), and thiodiglycol (boiling point: 282° C.).

Sugar groups are also preferable as other solid components.

Specific examples of the sugar groups include, but are not limited to, monosaccharides, disaccharides, oligosaccharides (including trisaccharides and tetrasaccharides), and polysaccharides.

Specific examples thereof include, but are not limited to, glucose, mannose, fructose, ribose, xylose, arabinose, galactose, maltose, cellobiose, lactose, saccharose, trehalose, and maltotriose.

Polysaccharides represent sugar in a broad sense and are materials that are present widely in nature, for example, α-cyclodextrine and cellulose.

In addition, specific examples of derivatives of these sugar groups include, but are not limited to, reducing sugars (for example, sugar alcohols (represented by $HOCH2(CHOH)_n CH_2OH$, where n represents an integer) of the sugar groups specified above, oxidized sugars (e.g., aldonic acid and uronic acid), amino acid, and thio acid.

Of these, sugar alcohols are preferable and specific examples thereof include, but are not limited to, maltitol and sorbit.

In some embodiments, of these hydrosoluble organic solvents, in terms of maintenance of discharging and coating stability and flocculation functionality of a pre-processing fluid, polyols are used. Specific examples thereof include, but are not limited to, glycerin, 1,3-butane diol, and 3-methyl-1,3-butane diol.

The solids content ratio of the hydrosoluble organic solvent in the pre-processing fluid is not particularly limited but typically ranges from 5% by weight to 50% by weight and preferably from 10% by weight to 20% by weight.

Within this range, the drying property and flocculation property of the pre-processing fluid are excellent and also a suitable viscosity is obtained.

Other Components

Other components that can be optionally added to the pre-processing fluid are described.

In addition to the components, the pre-processing fluid optionally contains a permeating agent, a foam suppressor, a pH regulator, an anti-septic and anti-fungal agents, and an anti-corrosion.

Penetrating Agent

The pre-processing fluid for use in the present disclosure preferably contains at least one kind of non-wetting agent polyol compounds or glycol ether compounds having 8 to 11 carbon atoms as permeating agent. In addition, such a permeating agent having a solubility of from 0.2% by weight to 5% by weight in water at 25° C. is preferable.

Of these, 2-ethyl-1,3-hexane diol (solubility: 4.2% at 25° C.) and 2,2,4-trimethyl-1,3-pentane diol (solubility: 2.0% at 25° C.) are particularly preferable.

Specific examples of the other non-wetting agent polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

Another permeating agent that can be used in combination are any agent that can be adjusted to have desired characteristics when dissolved in a pre-processing fluid. Specific examples thereof include, but are not limited to, alkyl and allyl ethers of polyols such as diethylene glycol monophenylether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether and lower alcohols such as ethanol.

The content of the permeating agent in the pre-processing fluid is preferably from 0.1% by weight to 5.0% by weight. Within this range, permeation properties are particularly excellent.

Foam Suppressor

The pre-processing fluid optionally contains a foam suppressor to suppress foaming (meaning liquid forming a thin layer to enwrap air).

The content of a foam suppressor in the pre-processing fluid preferably ranges from 0.01% by weight to 10% by weight and, particularly preferably from 0.02% by weight to 5% by weight in terms of suppressing foams.

pH Adjusting Agent

The pH regulator can be any agent capable of adjusting the pH of prescribed pre-processing fluid to be from 4 to 8 and suitably selected to a particular application.

Preferred specific examples of the pH adjusting agent for use in the present disclosure include, but are not limited to, alcohol amines, hydroxides of alkali metal element, ammonium hydroxides, phosphonium hydroxides, and alkali metal carbonates.

Anti-Septic and Anti-Fungal Agent

Specific examples of the anti-septic and anti-fungal agents include, but are not limited, dehydrosodium acetate, sodium sorbinate, 2-pyridine thiol-1-oxide sodium, sodium benzoate, pentachlorophenol sodium, and 1,2-benzoisothiazoline-3-on sodium compounds.

Anti-Corrosion Agent (Corrosion Inhibitor)

Specific examples of the corrosion control (anti-corrosion) agents include, but are not limited to, acid sulfite, thiosodium sulfate, ammonium thiodiglycolate, diisopropyl ammonium nitride, pentaerythritol quaternary nitdride, dicyclohexyl ammonium nitride, and 1,2,3-benzotriazole.

Recording Method

Preferred embodiments are described below to further describe the recording method of the present disclosure.

The recording method of the present disclosure includes a step of attaching the pre-processing fluid of the present disclosure to a recording medium, a step of drying the attached pre-processing fluid, and a step of ejecting an aqueous ink by an inkjet method to the recording medium to which the pre-processing fluid has been attached to form an image. Each of the steps are described.

Step of Attaching Pre-Processing Fluid

The step of attaching a pre-processing fluid is executed by any method uniformly attaching the pre-processing fluid of the present disclosure to the surface of the recording medium without limitation. Specific examples of such methods include but are not limited, blade coating method, gravure coating method, gravure offset coating method, a bar coating method, roll coating method, knife coating method, air knife coating method, comma coating method, U comma coating method, AKKU coating method, smoothing coating method, microgravure coating method, reverse roll coating method, four or five roll coating method, dip coating method, curtain coating method, slide coating method, and die coating method.

The wet attached amount (the attached amount of the pre-processing fluid prior to drying the recording medium) of the pre-processing fluid to a recording medium in the step of attaching the pre-processing fluid preferably ranges from 0.1 $g/m^2$ to 20.0 $g/m^2$, and more preferably from 0.5 $g/m^2$ to 10.0 $g/m^2$.

Step of Drying Attached Pre-Processing Fluid

The step of drying the pre-processing fluid attached to a recording medium is executed by any method artificially drying the pre-processing fluid to a degree that no problem occurs to any transfer member that contacts the attached pre-processing fluid between the step of attaching the pre-processing fluid and image formation by jetting an ink after the attached pre-processing fluid is transferred to the recording medium or the image quality is not degraded by accumulation of contaminants. The drying temperature is preferably from 40° C. to 130° C. and more preferably from 80° C. to 100° C. Within this range, it is possible to set the drying time short and prevent impacts on the quality of a recording medium, which is preferable.

Examples of the drying methods are heat drum systems, oven systems, hot air spraying systems, and heated roller systems. In addition, these systems can be used in combination.

Ink

The compositions of the ink for use in the present disclosure are described.

The ink composition for use in the present disclosure contains a colorant for printing, water to disperse the colorant, a hydrosoluble organic solvent, a particular surfactant, and other optional additives such as an antiseptic agent and a pH regulator. It is suitable to use an ink for inkjet recording having an ink viscosity of from 5 mPa·sec to 20 mPa·sec at 25° C. and containing a hydrosoluble organic solvent in an amount of from 20% by weight to 50% by weight.

Next, the compositions of the ink are described.

It is preferable to use a polymer emulsion in which polymer particulates contain a colorant insoluble or little soluble in water. "Polymer particulates contain a colorant" means either or both of a state in which a colorant is encapsulated in polymer particulates and a state in which a colorant is adsorbed to the surface of polymer particulates. In this case, all the colorant mixed in the ink is not necessarily encapsulated in or adsorbed to the polymer particulates and some of the colorant is possibly dispersed in the emulsion unless they have an adverse impact. The colorant can be any colorant insoluble or little soluble in water that can be adsorbed by the polymer and can be selected without any limitation. "Insoluble or little soluble in water" means that 10 parts by weight or more of a colorant is not dissolved in 100 parts of water at 20° C. "Dissolved" means separation or sedimentation of a colorant is not visually confirmed at the surface or the bottom of an aqueous solution. Examples of the colorant are dyes such as oil-soluble dyes and dispersed dyes and pigments. In terms of adsorption and encapsulation, oil-soluble dyes and dispersion dyes are preferable but pigments are preferable when it comes to the light resistance of an obtained image.

Each of the dyes for use in the present disclosure is preferably dissolved in an organic solvent such as ketone-based solvent in an amount of 2 g/L and more preferably from 20 g/L to 600 g/L to be efficiently impregnated in polymer particulates.

The pigments for use in the present disclosure are carbon black serving as black pigment. Specific examples of color pigments include, but are not limited to, anthraquinone, phthalocyanine blue, phthalocyanine green, dizao, monoazo, pyranthrone, perylene, heterocyclic type yellow, quinacridone, and (thio)indigoido. Typical examples of phthalocyanine blue are copper phthalocyanine blue and derivatives (e.g. Pigment Blue 15) thereof. Specific examples of quinacridone include, but are not limited to, Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Specific examples of anthraquinone include, but are not limited to, Pigment Red 43, Pigment Red 194 (perinone red), Pigment Red 216 (brominated pyran red), and Pigment Red 226 (pyranthrone red). Specific examples of perylene include, but are not limited to, Pigment Red 123 (vermillion), pigment red 149 (scarlet), Pigment Red (maroon), Pigment Red (red), Pigment Violet, Pigment Red 189 (yellow shade red), and Pigment Red 224. Specific examples of thioindigoido include, but are not limited to, Pigment Orange 86, Pigment Red 88, Pigment Red 181, Pigment Red 198, Pigment Violet 36, and Pigment Violet 38. Specific examples of the heterocyclic type yellow include, but are not limited to, Pigment Yellow 117 and Pigment Yellow 138.

When the colorant is a pigment, the dyes mentioned above are optionally used in combination considering complementary color and color toning. Also, as for black pigment ink, as disclosed in JP-H5-186704-A and JP-H8-3498-A, so-called self dispersible carbon black has been developed for stable dispersion without using a dispersing agent by introducing a hydrophillic group to the surface of carbon.

In addition, the mixing amount of the colorant is from about 10% by weight to about 200% by weight and particularly preferably from about 25% by weight to about 150% by weight to the mass of a polymer.

Specific examples of the polymers forming the polymer emulsions include, but are not limited to, vinyl-based polymers, polyester-based polymers, and polyurethane-based polymers.

Vinyl-based polymers, polyester-based polymers, and the polymers specified in JP-2000-53897-A and JP-2001-139849-A are particularly preferable.

In some embodiments, the average particle diameter of polymer particulates containing these colorants is preferably 0.30 µm at maximum and preferably 0.16 µm at maximum in ink.

The solids content of the polymer particulates in ink is preferably from about 8% by weight to about 20% by weight and more preferably from 8% by weight to 12% by weight.

As for the hydrosoluble organic solvent, the ink of the present disclosure is prepared by using water as liquid medium. Hydrosoluble organic solvents are used to impart desired properties to ink, prevent ink from drying, or improve the dispersion stability. These hydrosoluble organic solvents can be used alone or in combination.

Specific examples of the hydrosoluble organic solvents are the same as those for use in preparation of the pre-processing fluid.

In addition, ureas and alkyl glycine are optionally mixed in the present disclosure. Specific examples of such ureas include, but are not limited, urea, thiourea, and 1,3-dimethyl-2-imidazolidinone. Specific examples of alkyl glycine include, but are not limited to N-methyl glycine, N,N-dimethyl glycine, and N-ethyl glycine.

The hydrosoluble organic solvents optionally include sugar groups. Specific examples thereof include, but are not limited to, the same as the sugars for use in preparation of the pre-processing fluid.

The mixing amount of the hydrosoluble organic solvent is preferably from 20% by weight to 50% by weight. Since the polymer particulates containing a colorant account for at least 8% by weight or more and preferably 8% by weight to 20% by weight, the ratio of the hydrosoluble organic solvent to the polymer particulate solids content is from 1.0 to 6.25, and preferably from 2.0 to 6.0, and more preferably, from 3.0 to 5.5. The ink within this range is extremely good about drying property, storage test, and reliability test.

For the ink of the present disclosure, a fluorine-containing surfactant represented by the following chemical formula 3 or 4 is used.

(3)

Chemical formula 3

A symbol "n" represents an integer of from 1 to 40.

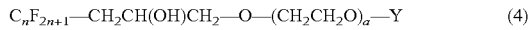

(4)

Chemical formula 4 where Y represents $C_nF_{2n+1}$ or $CH_2CH(OH)CH_2-C_nF_{2n+1}$, "n" represents an integer of from 4 to 6, and "a" represents an integer of from 4 to 14. The chemical formula 4 may take a form when "a" is 8 or 9.

Optionally, it is possible to use other surfactants such as anion-based surfactants, nonion-based surfactants, acetylene glycol-based surfactants, and amphoteric surfactants in combination.

Specific examples of the anion-based surfactants include, but are not limited to, polyoxyethylene alkyl ether acetates, dodecyl benzene sulfonates, laurates, and polyoxyethylene alkyl ether sulfates.

Specific examples of the nonion-based surfactants include, but are not limited to, polyoxyethylene alkyl ether, polyoxypropylene polyoxyethylene alkyl ether, polyoxyethylene alkyl esters, polyoxy ethylene sorbitan aliphatic acid esters, polyoxyethylene alkyl phenyl ethers, polyoxyethylene alkyl amines, and polyoxyethylenealky amides.

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}. Of these, SURFYNOL® 104, 465, and TG are particularly good to demonstrate good printing quality.

Specific examples of the amphoteric surfactants include, but are not limited to, lauryl aminopropionic acid salts, lauryl dimethyl betaine, steallyl dimethyl betaine, and lauryl dihydroxyethyl betaine.

Specific examples of the fluorine-containing surfactants include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, FC-431, an FC-4430 (all manufactured by SUMITOMO 3M); MEGAFAC F-470, F-1405, and F-474 (all manufactured by DIC CORPORATION); ZONYL® FS-300, FSN, FSO-100, and FSO (all manufactured by E.I. du Pont de Nemours & Company Inc.); F-top EF-351, EF-352, EF-801, and EF-802 (all manufactured by Mitsubishi Materials Electronic Chemicals Co., Ltd.), and DSN-403N (manufactured by DAIKIN INDUSTRIES, ltd.)

Of these, DSN-403N and ZONYL FS-300 are particularly excellent in terms of reliability and improvement of coloring.

These surfactants can be used alone or in combination.

The ink of the present disclosure optionally contains the following additives in addition to the colorant, the hydrosoluble organic solvent, and the surfactant mentioned above.

Specific examples of anti-septic and anti-fungal agents include, but are not limited, dehydrosodium acetate, sodium sorbinate, 2-pyridine thiol-1-oxide sodium, sodium benzoate, and pentachlorophenol sodium. 1,2-benzisothiazoline-3-on is particularly suitable.

The pH regulator can be any of those capable of adjusting the pH of prescribed ink to be 7 or higher.

Specific examples of the anti-corrosion agents include, but are not limited to, acid sulfite, thiosodium sulfate, ammonium thiodiglycolate, diisopropyl ammonium nitrite, pentaerythritol quaternary nitride, and dicyclohexyl ammonium nitrite.

Furthermore, hydrosoluble ultraviolet absorber, hydrosoluble infrared absorber, etc. can be added to a particular application.

It is preferable that the pre-processing fluid and the aqueous ink satisfy the following relation: The static surface tension of the pre-processing fluid is greater than that of the aqueous ink at 25° C. with a difference of from 5.0 mN/m to 10 mN/m.

Step of Attaching Ink

In the step of attaching ink in the recording method of the present disclosure, the ink is attached to a recording medium to record an image thereon after the pre-processing fluid is attached to the recording medium followed by drying of the pre-processing fluid thereon.

The method of attaching ink is conducted by attaching an ink to a recording medium by applying a stimulus (energy) to the ink by a suitable device to eject the ink thereonto.

Specifically, any known inkjet method is applicable. Such inkjet recording methods include an inkjet recording method using lined heads to record images on a continuous recording medium and an inkjet recording method scanning heads.

There is no specific limit to the driving system for recording heads serving as a device to ejecting an ink in the step of ink attachment.

This driving system includes a system using a piezoelectric element actuator utilizing lead zirconate thitanate (PZT) and functionality of thermal energy, a system using on-demand type heads using an actuator utilizing electrostatic force, and a system recording by charge-control type heads of a continuous jetting type.

Recording Device

An inkjet recording device to record an image on a recording medium after the pre-processing fluid for use in the present disclosure is imparted to the recording medium and dried is described with reference to FIG. 1. FIG. 1 is a view illustrating an inkjet recording device for recording an image on a continuous recording medium using a lined head. The inkjet recording device optionally includes a recording unit having the inkjet recording head.

In FIG. 1, a recording medium 101 having a coated layer on at least one surface thereof is transferred in a path 107 via a transfer roller.

Thereafter, the pre-processing fluid is imparted (step of imparting pre-processing fluid) to the coated layer of the recording medium 101 by a pre-processing fluid imparting device 102 and dried by a drying device 104 (step of drying) via rollers 103, etc. Thereafter, an image is formed on the surface of the dried pre-processing fluid on the recording medium 101 by an aqueous ink ejected according to an inkjet method by a printing device including an ink cartridge (ink container) 105 having recording heads 108 so that a recording medium 106 having an image formed thereon is formed.

Figure 2:
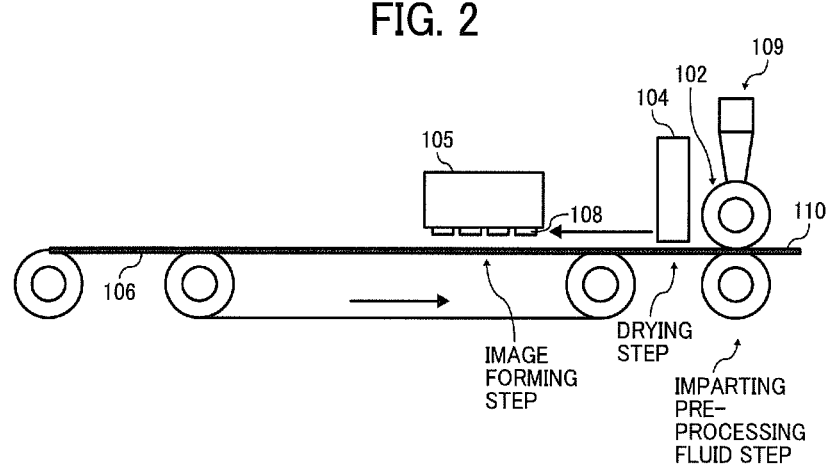
FIG. 2 is an enlarged diagram illustrating the steps of imparting a pre-processing fluid, drying, and forming an image.

FIG. 2 is a diagram illustrating the steps of imparting a pre-processing fluid, drying, and forming an image.

Recording Medium

The recording medium has a substrate and a coated layer on at least one surface of the substrate. Specific examples of the recording medium having a coated layer includes, but are not limited to, gloss paper, special paper, cloth, film, transparent sheets, and plain paper.

The recording medium can be coated paper on market, coated paper for offset printing, coated paper for gravure printing, etc. in addition to inkjet recording media.

The coated paper on market includes cast-coated paper, so-called art paper (A0 size, A1 size), A2 size coated paper, A3 size coated paper, B2 size coated paper, light-weight coated paper, micro-coated paper, etc. used for commercial printing or publishing printing such as offset printing and gravure printing. Specific examples thereof include, but are not limited to, Aurora coat, (manufactured by Nippon Paper), OK top coat+, POD gloss coat (manufactured by Oji Paper Co., Ltd.).

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative examples but not limited thereto.

Preparation Examples of Flocculating Agent

Preparation Example 1 of Flocculating Agent 200.0 g (2.218 mol) of 50% dimethyl amine and 291.0 g (1.477 mol) of 30% trimethyl amine were charged in a glass autoclave (1,000 mL) equipped with a stirrer, a thermometer, and a nitrogen introducing tube and 274.0 g (2.961 mol) of epichlorohydrine was introduced thereto in two hours while being cooled down at 40° C. after nitrogen replacement. The resultant was aged for one hour at the same temperature and thereafter heated to 80° C. and aged for three hours.

Subsequent to being cooled down, the pH was adjusted to be 5.0 by 77.0 g of 35% hydrochloric acid and 0.82 g of 75% phosphoric acid (Ratio against solids content: 730 ppm) to obtain 840.0 g of a flocculating agent for inkjet recording medium formed of a quaternary salt of an adduct of alkyl amine.epichlorohydrine having a solids content concentration of 58% and a quaternary ratio of 91%. The yield ratio was 99.7%. This flocculating agent was defined as [Preparation example 1 of flocculating agent].

The flocculating agent had a viscosity of 21 mPa·s.

Preparation Example 2 of Flocculating Agent

As in the preparation example 1 of flocculating agent, 200.0 g (2.218 mol) of 50% dimethyl amine and 218.5 g (1.109 mol) of 30% trimethyl amine were charged and 257.0 g (2.777 mol) of epichlorohydrine was introduced in two hours while being cooled at 40° C. after nitrogen replacement. The resultant was aged for one hour at the same temperature and thereafter heated to 80° C. and aged for three hours.

Subsequent to being cooled down, the pH was adjusted to be 5.0 by 54.5 g of 35% hydrochloric acid and 0.92 g of 75% phosphoric acid. Moreover, the resultant was diluted with pure water in such a manner that the solids content concentration became 60% to obtain a flocculating agent for inkjet recording medium. This flocculating agent was defined as [Preparation example 2 of flocculating agent].

The flocculating agent had a viscosity of 36 mPa·s.

Preparation Example 3 of Flocculating Agent

As in the preparation example 1 of flocculating agent, 200.0 g (2.218 mol) of 50% dimethyl amine and 174.8 g (0.887 mol) of 30% trimethyl amine were charged and 246.0 g (2.659 mol) of epichlorohydrine was introduced in two hours while being cooled down at 40° C. after nitrogen replacement. The resultant was aged for one hour at the same temperature and thereafter heated to 80° C. and aged for three hours.

Subsequent to being cooled down, the pH was adjusted to be 5.0 by 46.2 g of 35% hydrochloric acid and 0.87 g of 75% phosphoric acid. Moreover, the resultant was diluted with pure water in such a manner that the solids content concentration became 60% to obtain a flocculating agent for inkjet recording medium.

This flocculating agent was defined as [Preparation example 3 of flocculating agent].

The flocculating agent had a viscosity of 40 mPa·s. The weight average molecular weight was 5,000 as measured by gel permeation chromatography (HLC-8320 GPC, manufactured by Tosoh Corporation.) The measuring conditions of the weight average molecular weight were as follows:

Standard: polyethylene glycol
Solvent: sodium nitride 0.1% by weight (eluent)
Column: guard column+TSK gel G3000 PWxL, G5000, G6000, four connected (special column for cation polymer)

Preparation Example 4 of Flocculating Agent

As in the preparation example 1 of flocculating agent, 200.0 g (2.218 mol) of 50% dimethyl amine and 145.7 g (0.739 mol) of 30% trimethyl amine were charged and 239.0 g (2.583 mol) of epichlorohydrine was introduced in two hours while being cooled down at 40° C. after nitrogen replacement. The resultant was aged for one hour at the same temperature and thereafter heated to 80° C. and aged for three hours.

Subsequent to being cooled down, the pH was adjusted to be 5.0 by 38.5 g of 35% hydrochloric acid and 0.82 g of 75% phosphoric acid. Moreover, the resultant was diluted with pure water in such a manner that the solids content concentration became 60% to obtain a flocculating agent for inkjet recording medium. This flocculating agent was defined as [Preparation example 4 of flocculating agent].

The flocculating agent had a viscosity of 48 mPa·s.

Preparation Example 5 of Flocculating Agent

As in the preparation example 1 of flocculating agent, 200.0 g (2.218 mol) of 50% dimethyl amine and 145.7 g (0.739 mol) of 30% trimethyl amine were charged and 239.0 g (2.583 mol) of epichlorohydrine was introduced in two hours while being cooled down at 40° C. after nitrogen replacement. The resultant was aged for one hour at the same temperature and thereafter heated to 80° C. and aged for three hours.

Subsequent to being cooled down, the pH was adjusted to be 4.0 by 38.5 g of 35% hydrochloric acid and 1.6 g of 75% phosphoric acid. Moreover, the resultant was diluted with pure water in such a manner that the solids content ratio became 60% to obtain a flocculating agent for inkjet recording medium. This flocculating agent was defined as [Preparation example 5 of flocculating agent].

The flocculating agent had a viscosity of 48 mPa·s.

Preparation Example 6 of Flocculating Agent

As in the preparation example 1 of flocculating agent, 200.0 g (2.218 mol) of 50% dimethyl amine and 291.0 g (1.477 mol) of 30% trimethyl amine were charged and 274.0 g (2.961 mol) of epichlorohydrine was introduced in two hours while being cooled down at 40° C. after nitrogen replacement. The resultant was aged for one hour at the same temperature and thereafter heated to 80° C. and aged for three hours.

Subsequent to being cooled down, the pH was adjusted to be 5.0 by 77.0 g of 35% hydrochloric acid. Moreover, the resultant was diluted with pure water in such a manner that the solids content concentration became 60% to obtain a flocculating agent for inkjet recording medium. This flocculating agent was defined as [Preparation example 6 of flocculating agent].

The flocculating agent had a viscosity of 20 mPa·s. The weight average molecular weight was 2,000.

Preparation Example 7 of Flocculating Agent

A flocculating agent having a solids content concentration of 58% and a quaternary ratio of 91% was manufactured in the same manner as in Preparation example 1 of the flocculating agent. This flocculating agent was defined as [Preparation example 7 of flocculating agent].

Thereafter, 6.4 g (0.022 mol) of 3-chloro-2-hydroxy propyl trimethyl ammonium chloride serving as a quaternarization agent and 4.7 g (0.022 mol) of glycidyl trimethyl ammonium chloride were added to the thus-obtained polymer aqueous solution followed by stirring at 60° C. for two hours.

The pH of the thus-obtained polymer aqueous solution became 4.8 and the quaternary ratio reached 99%.

The solution had a viscosity of 23 mPa·s.

Preparation Example 8 of Flocculating Agent 95.1 g of water and 131.8 g (0.8 mol) of 58% trimethyl amine hydrochloric acid salt aqueous solution were charged in a flask equipped with a stirrer, a thermometer, a reflux condenser, and a nitrogen introducing tube and 74.0 g (0.8 mol) of epichlorohydrine was dropped thereto in three hours while being cooled down not to surpass 40° C. under nitrogen gas atmosphere.

Thereafter, the resultant was heated to 80° C. and reacted in one hour.

Thereafter, subsequent to being cooled down to 30° C., 36.1 g (0.4 mol) of 50% dimethyl amine aqueous solution and 14.8 g (0.2 mol) of calcium hydroxide were added and the resultant was heated to 80° C. and reacted in one hour.

Thereafter, the reaction liquid was adjusted by hydrochloric acid and water in such a manner that the pH thereof became 4.0 and the solids content concentration became 50% to obtain [Preparation example 8 of flocculating agent].

Preparation Example 9 of Flocculating Agent 36.8 g of water, 157.6 g (0.8 mol) of 30% trimethyl amine aqueous solution, and 36.1 g (0.4 mol) of 50% dimethyl amine aqueous solution, 7.3 g (0.1 mol) of diethylamine were charged in a flask (500 ml) equipped with a stirrer, a thermometer, a reflux condenser, and a nitrogen introducing tube and 92.5 g (1.0 mol) of epichlorohydrine was dropped thereto in four hours while being cooled down not to surpass 40° C. under nitrogen gas atmosphere.

Thereafter, the resultant was heated to 80° C. and reacted in two hours.

Thereafter, subsequent to being cooled down to 30° C., the reaction liquid was adjusted by sulfuric acid and water in such a manner that the pH thereof became 3.9 and the solids content concentration became 50% to obtain [Preparation example 9 of flocculating agent].

Preparation Example 10 of Flocculating Agent 495 g (4.8 mol) of diethylene triamine was charged in a flask (3 litter) equipped with a copolymer thermometer, a condenser, a stirrer, and a nitrogen introducing tube and 877 g (6.0 mol) of adipic acid was added thereto while being stirred. The system was heated while removing water produced out of the system to conduct reaction at 150° C. for five hours.

Thereafter, 1,000 g of water was gradually added thereto to obtain a liquid containing polyamide polyamine.

The liquid containing polyamide polyamine had a solids content of 52.1% by weight. 100 g of the thus-obtained liquid containing polyamide polyamine (0.214 mol as amino group), 3.8 g of acetic acid (30% equivalent %), and 4.3 g (15 equivalent %) of 30% sodium hydroxide aqueous solution were prepared and 6.7 g of water was added to make the solids content 50%.

Next, after 19.8 g (100 equivalent %) of epichlorohydrine was dropped thereto at 30° C. in one hour and the system was held at the same temperature for one hour. 0.8 g (2 equivalent %) of sodium methbisulfite was added and the system was held at the same temperature for five hours from the time of starting dropping epichlorohydrine Thereafter, 1.1 g (10 equivalent %) of 98% sulfuric acid and 127.0 g of water were added to obtain a solids content of 30% followed by heating to 75° C.

Furthermore, this temperature was maintained until the viscosity of the reaction liquid at 25° C. reached 300 mPa·s. Thereafter, 40.5 g of water was added in such a manner that the solid content became 26%. When cooled down to 25° C. or lower, the pH of the system was adjusted by 30% sulfuric acid to be 3.5 followed by 88% formic acid to the pH of 3.0 to obtain [Preparation example 10 of flocculating agent] having a solids content concentration of 25.0%.

Preparation Example 11 of Flocculating Agent 443.85 g of water and 41.27 g of diethylene triamine were charged in a flask (1 litter) equipped with a polyamine-epichlorohydrine copolymer stirrer, a thermometer, a reflux condenser, and a nitrogen-introducing tube and 111.04 g of epichlorohydrine was dropped thereto in a nitrogen atmosphere in 1.5 hours not to surpass 40° C. Thereafter, 19.4 g of octahydro-4,7-methanoindene-1(2),5(6)-dimethane amine was added thereto and the system was stirred for 30 minutes.

18.51 g of epichlorohydrine was dropped to the flask in 0.5 hours not to surpass 40° C. and thereafter the system was heated to 70° C. and maintained for 1.5 hours.

Thereafter, 30% sodium hydride aqueous solution was added to adjust the pH of the system to be 7.5. The temperature of the system was maintained for 1.5 hours.

The pH of the system was adjusted to be 3.5 by 30% sulfuric acid aqueous solution followed by cooling-down to complete the reaction.

The thus-obtained reaction product, which was [Preparation example 11 of flocculating agent], had a solids content of 30.2% and a pH of 3.9.

Preparation Example 12 of Flocculating Agent 657.2 g of water, 58.4 g of triethylene tetraamine, and 108 g of 50% dimethyl amine were charged in a flask (1 litter) equipped with a stirrer, a thermometer, a reflux condenser, and a nitrogen-introducing tube. 192.4 g of epichlorohydrine was dropped to the flask in a nitrogen atmosphere in 1.5 hours not to surpass 40° C. and thereafter the system was heated to 70° C. and maintained for 1.5 hours.

Thereafter, 30% sodium hydride aqueous solution was added to adjust the pH of the system to be 7.5. The system was maintained at 70° C. for 1.5 hours followed by pH adjustment to 3.5 by 30% sulfuric acid aqueous solution and cooled down to complete the reaction.

The thus-obtained reaction product, which was [Preparation example 12 of flocculating agent], had a solids content of 29.9% and a pH of 3.5.

Preparation Examples of Pigment Dispersion Element

Preparation Example 1 of Pigment Dispersion Element

Preparation of Magenta Pigment Containing Polymer Particulate Liquid Dispersion

Preparation of Polymer Solution A

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethlene glycol methacrylate, 4.0 g of styrene macromer, and 0.4 g of mercapto ethanol were mixed in the flask followed by heating to 65° C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methylethyl ketone was dropped to the flask in two and a half hours. Subsequently, a liquid mixture of 0.8 g of azobis methyl valeronitrile and 18 g of methylethyl ketone was dropped to the flask in half an hour. After one-hour aging at 65° C., 0.8 g of azobismethyl valeronitrile was added followed by further one-hour aging. After the reaction was complete, 364 g of methylethyl ketone was added to the flask to obtain 800 g of polymer solution A having a concentration of 50% by weight.

Preparation of Pigment Containing Polymer Particulate Liquid Dispersion

After 28 g of the polymer solution A, 42 g of C.I. Pigment Red 122, 13.6 g of 1 mol/L potassium hydroxide solution, 20 g of methylethyl ketone, and 13.6 g of deionized water were sufficiently stirred, the mixture was mixed and kneaded using a roll mill. The obtained paste was placed in 200 g of pure water followed by sufficient stirring. Methylethyl ketone and water were distilled away using an evaporator. Furthermore, to remove coarse particles, this liquid dispersion was filtrated under pressure by a polyvinylidene fluoride membrane filter having an average hole diameter of 5.0 μm.

Consequently, a liquid dispersion of polymer particulates containing a magenta pigment was obtained, which contained the pigment in an amount of 15% by weight and a solids content of 20% by weight. This was defined to be [Preparation example 1 of pigment dispersion element].

When the average particle diameter ($D_{50}$) of the polymer particulates of [Pigment example 1 of pigment dispersion element] was measured, it was 82.7 nm. The average particle diameter ($D_{50}$) was measured by particle size distribution measuring instrument (NANOTRAC UPA-EX-150, manufactured by NIKKISO CO., LTD.).

Preparation Example 2 of Pigment Dispersion Element

Preparation of Cyan Pigment Containing Polymer Particulate Liquid Dispersion

A cyan pigment containing polymer particulate liquid dispersion was prepared in the same manner as in the preparation example 1 except that C.I. Pigment Red 122 serving as pigment was changed to a phthalocyanine pigment (C.I. Pigment Blue 15:3). This was defined as [Preparation example 2 of pigment dispersion element].

When the average particle diameter ($D_{50}$) of the polymer particulates in [Preparation example 2 of pigment dispersion element] was measured by particle size distribution measuring instrument (NANOTRAC UPA-EX-150, manufactured by NIKKISO CO., LTD.), it was 110.6 nm.

Preparation Example 3 of Pigment Dispersion Element

Preparation of Yellow Pigment Containing Polymer Particulate Liquid Dispersion

A yellow pigment containing polymer particulate liquid dispersion was prepared in the same manner as in the preparation example 1 except that C.I. Pigment Red 122 serving as pigment was changed to a monoazo yellow pigment (C.I. Pigment Yellow 74). This was defined as [Preparation example 3 of pigment dispersion element].

When the average particle diameter ($D_{50}$) of the polymer particulates in [Preparation example 3 of pigment dispersion element] was measured by particle size distribution measuring instrument (NANOTRAC UPA-EX-150, manufactured by NIKKISO CO., LTD.), it was 105.4 nm.

Preparation Example 4 of Pigment Dispersion Element

Preparation of Carbon Black Pigment Containing Polymer Particulate Liquid Dispersion A carbon black pigment containing polymer particulate liquid dispersion was prepared in the same manner as in the preparation example 1 except that C.I. Pigment Red 122 serving as pigment was changed to a carbon black (FW100, manufactured by Evonic Industries AG). This was defined as [Preparation example 4 of pigment dispersion element].

When the average particle diameter ($D_{50}$) of the polymer particulates in [Preparation example 4 of pigment dispersion element] was measured by particle size distribution measuring instrument (NANOTRAC UPA-EX-150, manufactured by NIKKISO CO., LTD.), it was 75.2 nm.

Examples and Comparative Examples of the pre-processing fluids prepared by using [Preparation example 1 of flocculating agent] to [Preparation example 12 of flocculating agent] and Examples and Comparative Examples of the inks obtained using the [Preparation example 1 of pigment dispersion element] to [Preparation example 4 of pigment dispersion element] are shown in Table 1.

Examples and Comparative Examples of Pre-Processing Fluid

The surfactants 1 to 3 used below are as follows:
Surfactant 1: Emulgen LS-106 (manufactured by Kao Corporation), weight average molecular weight: about 1,000
Surfactant 2: ZONYL® FS-300 (manufactured by E.I. du Pont de Nemours & Company Inc.), weight average molecular weight: about 1,000)
Surfactant 3: Unidyne DSN-403N (manufactured by DAIKIN INDUSTRIES, ltd.)
Surfactant 1 corresponds to a nonion-based surfactant represented by the chemical formula 2.
Surfactant 2 corresponds to a fluorine-containing surfactant represented by the chemical formula 3.
Surfactant 3 corresponds to a fluorine-containing surfactant represented by the chemical formula 4.

Example 1 of Pre-Processing Fluid

[Example 1 of pre-processing fluid] was prepared by adding pure water to [Preparation example 1 of flocculating agent], 1,3-butane diol, the surfactant 1, and a permeating agent (2,2,4-trimethyl-1,3-pentane diol) having ratios of 50% by weight, 15% by weight, 0.1% by weight, and 0.5% by weight, respectively, in such a manner that the total weight became 100% by weight followed by stirring for 30 minutes.

Example 2 of Pre-Processing Fluid

[Example 2 of pre-processing fluid] was prepared in the same manner as in [Example 1 of pre-processing fluid] except that the flocculating agent was changed to [Preparation example 2 of flocculating agent] and the permeating agent was changed to 2-ethyl-1,3-hexane diol.

Example 3 of Pre-Processing Fluid

[Example 3 of pre-processing fluid] was prepared in the same manner as in [Example 1 of pre-processing fluid] except that the flocculating agent was changed to [Preparation example 3 of flocculating agent] and the hydrosoluble organic solvent was changed to 1,2-pentane diol.

Example 4 of Pre-Processing Fluid

[Example 4 of pre-processing fluid] was prepared in the same manner as in [Example 1 of pre-processing fluid] except that the flocculating agent was changed to [Preparation example 4 of flocculating agent], the hydrosoluble organic solvent was changed to 1,2-pentane diol, and the permeating agent was changed to 2-ethyl-1,3-hexane diol.

Example 5 of Pre-Processing Fluid

[Example 5 of pre-processing fluid] was prepared in the same manner as in [Example 1 of pre-processing fluid] except that the flocculating agent was changed to [Preparation example 5 of flocculating agent], the hydrosoluble organic solvent was changed to 3-methyl-1,3-butane diol, and the permeating agent was changed to 2-ethyl-1,3-hexane diol.

Example 6 of Pre-Processing Fluid

[Example 6 of pre-processing fluid] was prepared in the same manner as in [Example 5 of pre-processing fluid] except that the flocculating agent was changed to [Preparation example 6 of flocculating agent] and the permeating agent was changed to 2-ethyl-1,3-hexane diol.

Example 7 of Pre-Processing Fluid

[Example 7 of pre-processing fluid] was prepared in the same manner as in [Example 1 of pre-processing fluid] except that the flocculating agent was changed to [Preparation example 7 of flocculating agent].

Example 8 of Pre-Processing Fluid

[Example 8 of pre-processing fluid] was prepared in the same manner as in [Example 1 of pre-processing fluid] except that the flocculating agent was changed to [Preparation example 8 of flocculating agent] and the permeating agent was changed to 2-ethyl-1,3-hexane diol.

Example 9 of Pre-Processing Fluid

[Example 9 of pre-processing fluid] was prepared in the same manner as in [Example 1 of pre-processing fluid] except that the flocculating agent was changed to [Preparation example 9 of flocculating agent].

Example 10 of Pre-Processing Fluid

[Example 10 of pre-processing fluid] was prepared in the same manner as in [Example 1 of pre-processing fluid] except that the flocculating agent was changed to [Preparation example 10 of flocculating agent].

Example 11 of Pre-Processing Fluid

[Example 11 of pre-processing fluid] was prepared in the same manner as in [Example 1 of pre-processing fluid] except that the flocculating agent was changed to [Preparation example 11 of flocculating agent] and the permeating agent was changed to 2-ethyl-1,3-hexane diol.

Example 12 of Pre-Processing Fluid

[Example 12 of pre-processing fluid] was prepared in the same manner as in [Example 1 of pre-processing fluid] except that the flocculating agent was changed to [Preparation example 12 of flocculating agent].

Comparative Example 1 of Pre-Pre-Processing Fluid

[Comparative example 1 of pre-processing fluid] was prepared in the same manner as in [Example 1 of pre-processing fluid] except that the hydrosoluble organic solvent was changed to 1,2-pentane diol and 0.1% by weight of [Surfactant 1] was changed to 0.05% by weight of [Surfactant 2].

Comparative Example 2 of Pre-Pre-Processing Fluid

[Comparative example 2 of pre-processing fluid] was prepared in the same manner as in [Comparative example 1 of pre-processing fluid] except that the flocculating agent of was changed to [Preparation example 2 of flocculating agent] and the permeating agent was changed to 2-ethyl-1,3-hexane diol.

Comparative Example 3 of Pre-Pre-Processing Fluid

[Comparative example 5 of pre-processing fluid] was prepared in the same manner as in [Example 5 of pre-processing fluid] except that the flocculating agent was changed to [Preparation example 3 of flocculating agent] and 0.1% by weight of [Surfactant 1] was changed to 0.05% by weight of [Surfactant 2].

Comparative Example 4 of Pre-Pre-Processing Fluid

[Comparative example 4 of pre-processing fluid] was prepared in the same manner as in [Comparative example 3 of pre-processing fluid] except that the flocculating agent was changed to [Preparation example 4 of flocculating agent] and the permeating agent was changed to 2-ethyl-1,3-hexane diol.

Comparative Example 5 of Pre-Pre-Processing Fluid

[Comparative example 5 of pre-processing fluid] was prepared in the same manner as in [Example 1 of pre-processing fluid] except that the flocculating agent was changed to [Preparation example 5 of flocculating agent], the hydrosoluble organic solvent was changed to 1,3-butane diol, and 0.1% by weight of [Surfactant 1] was changed to 0.05% by weight of [Surfactant 2].

Comparative Example 6 of Pre-Pre-Processing Fluid

[Comparative example 6 of pre-processing fluid] was prepared in the same manner as in [Example 1 of pre-processing fluid] except that the flocculating agent of [Example 1 of pre-processing fluid] was changed to [Preparation example 6 of flocculating agent], the hydrosoluble organic solvent was changed to 1,3-butane diol, and 0.1% by weight of [Surfactant 1] was changed to 0.05% by weight of [Surfactant 2].

Comparative Example 7 of Pre-Pre-Processing Fluid

[Comparative example 7 of pre-processing fluid] was prepared in the same manner as in [Example 5 of pre-processing fluid] except that the flocculating agent was changed to [Preparation example 7 of flocculating agent] and 0.1% by weight of [Surfactant 1] was changed to 0.05% by weight of [Surfactant 2].

Comparative Example 8 of Pre-Pre-Processing Fluid

[Comparative example 8 of pre-processing fluid] was prepared in the same manner as in [Example 6 of pre-processing fluid] except that the flocculating agent was changed to [Preparation example 8 of flocculating agent] and 0.1% by weight of [Surfactant 1] was changed to 0.05% by weight of [Surfactant 2].

Comparative Example 9 of Pre-Pre-Processing Fluid

[Comparative example 9 of pre-processing fluid] was prepared in the same manner as in [Comparative example 5 of pre-processing fluid] except that the flocculating agent was changed to a polyallyl amine acetic acid salt and [Surfactant 2] was changed to [Surfactant 3].

Comparative Example 10 of Pre-Pre-Processing Fluid

[Comparative example 10 of pre-processing fluid] was prepared in the same manner as in [Comparative example 6 of pre-processing fluid] except that the flocculating agent was changed to a polyallyl amine acetic acid salt and [Surfactant 2] was changed to [Surfactant 3].

Comparative Example 11 of Pre-Pre-Processing Fluid

[Comparative example 11 of pre-processing fluid] was prepared in the same manner as in [Comparative example 7 of pre-processing fluid] except that the flocculating agent was changed to a polyallyl amine acetic acid salt and [Surfactant 2] was changed to [Surfactant 3].

Comparative Example 12 of Pre-Pre-Processing Fluid

[Comparative example 12 of pre-processing fluid] was prepared in the same manner as in [Comparative example 8 of pre-processing fluid] except that the flocculating agent was changed to a polyallyl amine acetic acid salt and [Surfactant 2] was changed to [Surfactant 3].

The polyallyl amine acetic acid salt used was PAA-AC5050A (manufactured by Nitto Boseki Co., Ltd.), which has a different structure from the chemical formula 1.

Examples and Comparative Examples of Ink

Example 1 of Ink

[Example 1 of ink] was prepared by adding pure water to [Preparation example 1 of pigment dispersion element], hydrosoluble organic solvent (1,3-butane diol), [Surfactant 2], and a permeating agent (2,2,4-trimethyl-1,3-pentane diol) having ratios of 3% by weight, 15% by weight, 0.2% by weight, and 0.5% by weight, respectively, to be 100% by weight followed by stirring for 30 minutes and filtration by 1 μm filter.

Example 2 of Ink

[Example 2 of ink] was prepared in the same manner as in [Example 1 of ink] except that [Preparation example 1 of pigment dispersion element] was changed to [Preparation example 2 of pigment dispersion element] and the permeating agent was changed to 2-ethyl-1,3-hexane diol.

Example 3 of Ink

[Example 3 of ink] was prepared in the same manner as in [Example 1 of ink] except that [Preparation example 1 of pigment dispersion element] was changed to [Preparation example 3 of pigment dispersion element], the hydrosoluble organic solvent was changed to 1,2-pentane diol, and 0.2% by weight of [Surfactant 2] was changed to 0.1% by weight of [Surfactant 3].

Example 4 of Ink

[Example 4 of ink] was prepared in the same manner as in [Example 2 of ink] except that [Preparation example 2 of pigment dispersion element] was changed to [Preparation example 4 of pigment dispersion element], the hydrosoluble organic solvent was changed to 1,2-pentane diol, and 0.2% by weight of [Surfactant 2] was changed to 0.1% by weight of [Surfactant 3].

Comparative Example 1 of Ink

[Comparative example 1 of ink] was prepared in the same manner as in [Example 1 of pre-processing fluid] except that [Surfactant 2] was changed to [Surfactant 1].

Comparative Example 2 of Ink

[Comparative example 2 of ink] was prepared in the same manner as in [Example 2 of pre-processing fluid] except that [Surfactant 2] was changed to [Surfactant 1].

Comparative Example 3 of Ink

[Comparative example 3 of ink] was prepared in the same manner as in [Example 3 of pre-processing fluid] except that 0.1% by weight of [Surfactant 3] was changed to 0.2% by weight of [Surfactant 1].

Comparative Example 4 of Ink

[Comparative example 4 of ink] was prepared in the same manner as in [Example 4 of pre-processing fluid] except that 0.1% by weight of [Surfactant 3] was changed to 0.2% by weight of [Surfactant 1].

The surface tensions of the pre-processing fluids and the inks of Examples and Comparative Examples were measured. The measuring results and the difference between the surface tensions of the pre-processing fluids and the surface tension of the ink are shown in Table 1.

The surface tension was measured as follows.

Measuring of Surface Tension of Pre-Pre-Processing Fluid and Ink

The surface tension was measured at 25° C. by a fully-automatic surface tensiometer (CBVP-Z, manufactured by Kyowa Interface Science Co., Ltd.).

TABLE 1

| | Pre-processing fluid | Flocculating agent in pre-processing fluid | Surface tension of pre-processing fluid (mN/m) | Ink | Surface tension of ink (mN/m) | Difference of surface tension between pre-processing fluid and ink |
|---|---|---|---|---|---|---|
| Example 1 | Example 1 of pre-processing fluid | Example 1 of flocculating agent | 33.2 | Example 1 of ink | 24.6 | 8.6 |
| Example 2 | Example 2 of pre-processing fluid | Example 2 of flocculating agent | 34.2 | Example 2 of ink | 25.5 | 8.7 |
| Example 3 | Example 3 of pre-processing fluid | Example 3 of flocculating agent | 32.4 | Example 3 of ink | 24.8 | 7.6 |
| Example 4 | Example 4 of pre-processing fluid | Example 4 of flocculating agent | 32.2 | Example 4 of ink | 24.6 | 7.6 |
| Example 5 | Example 5 of pre-processing fluid | Example 5 of flocculating agent | 31.9 | Example 1 of ink | 24.6 | 7.3 |
| Example 6 | Example 6 of pre-processing fluid | Example 6 of flocculating agent | 32.6 | Example 2 of ink | 25.5 | 7.1 |
| Example 7 | Example 7 of pre-processing fluid | Example 7 of flocculating agent | 33.8 | Example 3 of ink | 24.8 | 9.0 |
| Example 8 | Example 8 of pre-processing fluid | Example 8 of flocculating agent | 32.4 | Example 4 of ink | 24.6 | 7.8 |
| Example 9 | Example 9 of pre-processing fluid | Example 9 of flocculating agent | 33.3 | Example 1 of ink | 24.6 | 8.7 |
| Example 10 | Example 10 of pre-processing fluid | Example 10 of flocculating agent | 31.8 | Example 2 of ink | 25.5 | 6.3 |
| Example 11 | Example 11 of pre-processing fluid | Example 11 of flocculating agent | 31.6 | Example 3 of ink | 24.8 | 6.8 |
| Example 12 | Example 12 of pre-processing fluid | Example 12 of flocculating agent | 32.5 | Example 4 of ink | 24.6 | 7.9 |

TABLE 1-continued

| | Pre-processing fluid | Flocculating agent in pre-processing fluid | Surface tension of pre-processing fluid (mN/m) | Ink | Surface tension of ink (mN/m) | Difference of surface tension between pre-processing fluid and ink |
|---|---|---|---|---|---|---|
| Comparative Example 1 | Comparative Example 1 of pre-processing fluid | Example 1 of flocculating agent | 35.4 | Comparative Example 1 of ink | 32.2 | 3.2 |
| Comparative Example 2 | Comparative Example 2 of pre-processing fluid | Example 2 of flocculating agent | 35.4 | Comparative Example 2 of ink | 32.2 | 3.2 |
| Comparative Example 3 | Comparative Example 3 of pre-processing fluid | Example 3 of flocculating agent | 35.7 | Comparative Example 3 of ink | 31.9 | 3.8 |
| Comparative Example 4 | Comparative Example 4 of pre-processing fluid | Example 4 of flocculating agent | 35.3 | Comparative Example 4 of ink | 34.2 | 1.1 |
| Comparative Example 5 | Comparative Example 5 of pre-processing fluid | Example 5 of flocculating agent | 35.1 | Comparative Example 1 of ink | 32.2 | 2.9 |
| Comparative Example 6 | Comparative Example 6 of pre-processing fluid | Example 6 of flocculating agent | 35.2 | Comparative Example 2 of ink | 32.2 | 0.6 |
| Comparative Example 7 | Comparative Example 7 of pre-processing fluid | Example 7 of flocculating agent | 35.4 | Comparative Example 3 of ink | 31.9 | 3.5 |
| Comparative Example 8 | Comparative Example 8 of pre-processing fluid | Example 8 of flocculating agent | 35.4 | Comparative Example 4 of ink | 34.2 | 1.2 |
| Comparative Example 9 | Comparative Example 9 of pre-processing fluid | Example 9 of flocculating agent | 35.2 | Comparative Example 1 of ink | 32.2 | 3.0 |
| Comparative Example 10 | Comparative Example 10 of pre-processing fluid | Example 10 of flocculating agent | 35.1 | Comparative Example 2 of ink | 32.2 | 2.9 |
| Comparative Example 11 | Comparative Example 11 of pre-processing fluid | Example 11 of flocculating agent | 35.6 | Comparative Example 3 of ink | 31.9 | 3.7 |
| Comparative Example 12 | Comparative Example 12 of pre-processing fluid | Example 12 of flocculating agent | 36.2 | Comparative Example 4 of ink | 34.2 | 2.0 |

Thereafter, the inks obtained in Examples and Comparative Examples were evaluated about the granularity and bronzing according to the evaluation method described in the Evaluation 1 method below.

Evaluation 1: Evaluation on Granularity (Non-Uniform Density)

The pre-processing fluid was applied to the coated layer of recording media having a coated layer (OK top coat +, manufacture by OJI PAPER CO., LTD.) at 5 g/m² by a roller coating method. Thereafter, according to an inkjet method, an aqueous ink was ejected by a single pass to form a 1,200 dpi solid image (3 cm×3 cm by using Microsoft® Word 2000).

Before the image was formed, the recording medium was dried at 90° C. for 30 seconds by an oven method after the pre-processing fluid was imparted. After the image was formed, the granularity (non0uniform density) evaluation of evaluation 1 was conducted.

Criteria of Evaluation 1

The granularity (non-uniform density) was visually confirmed compared to a sample and ranked according to the following 1 to 4.

1. Extreme non-uniform density and white spots (almost no ink was printed) on solid portion) apparent
2. Significant non-uniform density
3. Slight non-uniform density
4. No non-uniform density The evaluation results by Evaluation 1 are shown in Table 2.

Thereafter, the inks obtained in Examples and Comparative Examples were evaluated about bronzing according to the evaluation method described in the evaluation 2 method below.

Evaluation 2: Bronzing Evaluation

The solid image obtained in Evaluation 1 was visually checked under fluorescent lamp after printing and evaluated with regard to bronzing according to the following criteria.

Sensitivity Evaluation

1. Bronzing occurred and the colors of reflection light of fluorescent lamp were significantly different

TABLE 2

| | Pre-processing fluid | Flocculating agent in pre-processing fluid | Ink | Granularity |
|---|---|---|---|---|
| Example 1 | Example 1 of pre-processing fluid | Example 1 of flocculating agent | Example 1 of ink | 4 |
| Example 2 | Example 2 of pre-processing fluid | Example 2 of flocculating agent | Example 2 of ink | 3 |
| Example 3 | Example 3 of pre-processing fluid | Example 3 of flocculating agent | Example 3 of ink | 3 |
| Example 4 | Example 4 of pre-processing fluid | Example 4 of flocculating agent | Example 4 of ink | 3 |
| Example 5 | Example 5 of pre-processing fluid | Example 5 of flocculating agent | Example 1 of ink | 4 |
| Example 6 | Example 6 of pre-processing fluid | Example 6 of flocculating agent | Example 2 of ink | 3 |
| Example 7 | Example 7 of pre-processing fluid | Example 7 of flocculating agent | Example 3 of ink | 4 |
| Example 8 | Example 8 of pre-processing fluid | Example 8 of flocculating agent | Example 4 of ink | 4 |
| Example 9 | Example 9 of pre-processing fluid | Example 9 of flocculating agent | Example 1 of ink | 4 |
| Example 10 | Example 10 of pre-processing fluid | Example 10 of flocculating agent | Example 2 of ink | 4 |
| Example 11 | Example 11 of pre-processing fluid | Example 11 of flocculating agent | Example 3 of ink | 4 |
| Example 12 | Example 12 of pre-processing fluid | Example 12 of flocculating agent | Example 4 of ink | 4 |
| Comparative Example 1 | Comparative Example 1 of pre-processing fluid | Example 1 of flocculating agent | Comparative Example 1 of ink | 1 |
| Comparative Example 2 | Comparative Example 2 of pre-processing fluid | Example 2 of flocculating agent | Comparative Example 2 of ink | 1 |
| Comparative Example 3 | Comparative Example 3 of pre-processing fluid | Example 3 of flocculating agent | Comparative Example 3 of ink | 1 |
| Comparative Example 4 | Comparative Example 4 of pre-processing fluid | Example 4 of flocculating agent | Comparative Example 4 of ink | 1 |
| Comparative Example 5 | Comparative Example 5 of pre-processing fluid | Example 5 of flocculating agent | Comparative Example 1 of ink | 1 |
| Comparative Example 6 | Comparative Example 6 of pre-processing fluid | Example 6 of flocculating agent | Comparative Example 2 of ink | 1 |
| Comparative Example 7 | Comparative Example 7 of pre-processing fluid | Example 7 of flocculating agent | Comparative Example 3 of ink | Non-uniform application Unable to evaluate |
| Comparative Example 8 | Comparative Example 8 of pre-processing fluid | Example 8 of flocculating agent | Comparative Example 4 of ink | Non-uniform application Unable to evaluate |
| Comparative Example 9 | Comparative Example 9 of pre-processing fluid | Example 9 of flocculating agent | Comparative Example 1 of ink | Non-uniform application Unable to evaluate |
| Comparative Example 10 | Comparative Example 10 of pre-processing fluid | Example 10 of flocculating agent | Comparative Example 2 of ink | Non-uniform application Unable to evaluate |
| Comparative Example 11 | Comparative Example 11 of pre-processing fluid | Example 11 of flocculating agent | Comparative Example 3 of ink | Non-uniform application Unable to evaluate |
| Comparative Example 12 | Comparative Example 12 of pre-processing fluid | Example 12 of flocculating agent | Comparative Example 4 of ink | Non-uniform application Unable to evaluate |

2. Bronzing occurred and the colors of reflection light of fluorescent lamp were partially different
3. Bronzing was little observed. Slightly different coloring was observed
4. Bronzing was little observed The evaluation results are shown in Table 3.

Thereafter, the inks obtained in Examples and Comparative Examples were evaluated about the image gloss according to the evaluation method described in the evaluation 3 method below.

Evaluation 3: Image Gloss

The gloss of the solid portion obtained in Evaluation 1 was evaluated.

TABLE 3

| | Pre-processing fluid | Flocculating agent in pre-processing fluid | Ink | Bronzing |
|---|---|---|---|---|
| Example 1 | Example 1 of pre-processing fluid | Example 1 of flocculating agent | Example 1 of ink | 3 |
| Example 2 | Example 2 of pre-processing fluid | Example 2 of flocculating agent | Example 2 of ink | 3 |
| Example 3 | Example 3 of pre-processing fluid | Example 3 of flocculating agent | Example 3 of ink | 4 |
| Example 4 | Example 4 of pre-processing fluid | Example 4 of flocculating agent | Example 4 of ink | 4 |
| Example 5 | Example 5 of pre-processing fluid | Example 5 of flocculating agent | Example 1 of ink | 4 |
| Example 6 | Example 6 of pre-processing fluid | Example 6 of flocculating agent | Example 2 of ink | 4 |
| Example 7 | Example 7 of pre-processing fluid | Example 7 of flocculating agent | Example 3 of ink | 4 |
| Example 8 | Example 8 of pre-processing fluid | Example 8 of flocculating agent | Example 4 of ink | 4 |
| Example 9 | Example 9 of pre-processing fluid | Example 9 of flocculating agent | Example 1 of ink | 4 |
| Example 10 | Example 10 of pre-processing fluid | Example 10 of flocculating agent | Example 2 of ink | 3 |
| Example 11 | Example 11 of pre-processing fluid | Example 11 of flocculating agent | Example 3 of ink | 4 |
| Example 12 | Example 12 of pre-processing fluid | Example 12 of flocculating agent | Example 4 of ink | 4 |
| Comparative Example 1 | Comparative Example 1 of pre-processing fluid | Example 1 of flocculating agent | Comparative Example 1 of ink | 1 |
| Comparative Example 2 | Comparative Example 2 of pre-processing fluid | Example 2 of flocculating agent | Comparative Example 2 of ink | 1 |
| Comparative Example 3 | Comparative Example 3 of pre-processing fluid | Example 3 of flocculating agent | Comparative Example 3 of ink | 2 |
| Comparative Example 4 | Comparative Example 4 of pre-processing fluid | Example 4 of flocculating agent | Comparative Example 4 of ink | 2 |
| Comparative Example 5 | Comparative Example 5 of pre-processing fluid | Example 5 of flocculating agent | Comparative Example 1 of ink | 1 |
| Comparative Example 6 | Comparative Example 6 of pre-processing fluid | Example 6 of flocculating agent | Comparative Example 2 of ink | 1 |
| Comparative Example 7 | Comparative Example 7 of pre-processing fluid | Example 7 of flocculating agent | Comparative Example 3 of ink | Non-uniform application Unable to evaluate |
| Comparative Example 8 | Comparative Example 8 of pre-processing fluid | Example 8 of flocculating agent | Comparative Example 4 of ink | Non-uniform application Unable to evaluate |
| Comparative Example 9 | Comparative Example 9 of pre-processing fluid | Example 9 of flocculating agent | Comparative Example 1 of ink | Non-uniform application Unable to evaluate |
| Comparative Example 10 | Comparative Example 10 of pre-processing fluid | Example 10 of flocculating agent | Comparative Example 2 of ink | Non-uniform application Unable to evaluate |
| Comparative Example 11 | Comparative Example 11 of pre-processing fluid | Example 11 of flocculating agent | Comparative Example 3 of ink | Non-uniform application Unable to evaluate |
| Comparative Example 12 | Comparative Example 12 of pre-processing fluid | Example 12 of flocculating agent | Comparative Example 4 of ink | Non-uniform application Unable to evaluate |

60 degree gloss of a solid image portion was measured by using a gloss meter (4501, manufactured by BYK Gardner).

The evaluation results by Evaluation 3 are shown in Table 4.

As seen in Table 4, in Examples, granularity, bronzing, and gloss were improved after the pre-processing fluid was applied to the recording medium having a coated layer followed by drying. To the contrary, in Comparative Examples,

TABLE 4

|  | Pre-processing fluid | Flocculating agent in pre-processing fluid | Ink | Granularity |
|---|---|---|---|---|
| Example 1 | Example 1 of pre-processing fluid | Example 1 of flocculating agent | Example 1 of ink | 45.0 |
| Example 2 | Example 2 of pre-processing fluid | Example 2 of flocculating agent | Example 2 of ink | 48.0 |
| Example 3 | Example 3 of pre-processing fluid | Example 3 of flocculating agent | Example 3 of ink | 52.0 |
| Example 4 | Example 4 of pre-processing fluid | Example 4 of flocculating agent | Example 4 of ink | 43.0 |
| Example 5 | Example 5 of pre-processing fluid | Example 5 of flocculating agent | Example 1 of ink | 42.1 |
| Example 6 | Example 6 of pre-processing fluid | Example 6 of flocculating agent | Example 2 of ink | 46.2 |
| Example 7 | Example 7 of pre-processing fluid | Example 7 of flocculating agent | Example 3 of ink | 49.9 |
| Example 8 | Example 8 of pre-processing fluid | Example 8 of flocculating agent | Example 4 of ink | 41.1 |
| Example 9 | Example 9 of pre-processing fluid | Example 9 of flocculating agent44.3 | Example 1 of ink | 40.3 |
| Example 10 | Example 10 of pre-processing fluid | Example 10 of flocculating agent | Example 2 of ink | 44.3 |
| Example 11 | Example 11 of pre-processing fluid | Example 11 of flocculating agent | Example 3 of ink | 44.6 |
| Example 12 | Example 12 of pre-processing fluid | Example 12 of flocculating agent | Example 4 of ink | 40.9 |
| Comparative Example 1 | Comparative Example 1 of pre-processing fluid | Example 1 of flocculating agent | Comparative Example 1 of ink | 30.2 |
| Comparative Example 2 | Comparative Example 2 of pre-processing fluid | Example 2 of flocculating agent | Comparative Example 2 of ink | 29.8 |
| Comparative Example 3 | Comparative Example 3 of pre-processing fluid | Example 3 of flocculating agent | Comparative Example 3 of ink | 30.6 |
| Comparative Example 4 | Comparative Example 4 of pre-processing fluid | Example 4 of flocculating agent | Comparative Example 4 of ink | 31.1 |
| Comparative Example 5 | Comparative Example 5 of pre-processing fluid | Example 5 of flocculating agent | Comparative Example 1 of ink | 29.2 |
| Comparative Example 6 | Comparative Example 6 of pre-processing fluid | Example 6 of flocculating agent | Comparative Example 2 of ink | 26.7 |
| Comparative Example 7 | Comparative Example 7 of pre-processing fluid | Example 7 of flocculating agent | Comparative Example 3 of ink | Non-uniform application Unable to evaluate |
| Comparative Example 8 | Comparative Example 8 of pre-processing fluid | Example 8 of flocculating agent | Comparative Example 4 of ink | Non-uniform application Unable to evaluate |
| Comparative Example 9 | Comparative Example 9 of pre-processing fluid | Example 9 of flocculating agent | Comparative Example 1 of ink | Non-uniform application Unable to evaluate |
| Comparative Example 10 | Comparative Example 10 of pre-processing fluid | Example 10 of flocculating agent | Comparative Example 2 of ink | Non-uniform application Unable to evaluate |
| Comparative Example 11 | Comparative Example 11 of pre-processing fluid | Example 11 of flocculating agent | Comparative Example 3 of ink | Non-uniform application Unable to evaluate |
| Comparative Example 12 | Comparative Example 12 of pre-processing fluid | Example 12 of flocculating agent | Comparative Example 4 of ink | Non-uniform application Unable to evaluate | granularity was bad, bronzing occurred, and gloss was degraded.

According to the inkjet recording method of the present disclosure, the level of bronzing of images is improved.

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet recording method comprising:
   imparting a pre-processing fluid to a coated layer provided on at least one surface of a substrate of a recording medium;
   drying the pre-processing fluid; and
   forming an image on the recording medium by ejecting an aqueous ink thereon,
   wherein the pre-processing fluid comprises a hydrosoluble organic solvent, a flocculating agent formed of a quaternary salt of an adduct of alkyl amine.epichlorohydrine represented by the following chemical formula 1, and a nonion-based surfactant represented by the following chemical formula 2, Chemical formula 1

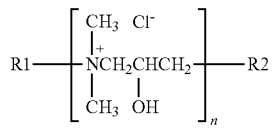

(1)

where R1 and R2 each, independently represent triaryl amine groups or diethylamine groups, and n represents an integer of from 4 to 40, $$R-O-(CH_2CH_2O)x-(CH_2C(CH_3)CH_2O)y-H \quad (2)$$

Chemical formula 2 where x represents 0 or an integer of from 1 to 5, y represents an integer of from 10 to 15, and R represents $C_mH_{2m+1}$, where m represents an integer of from 1 to 20, wherein the aqueous ink comprises a colorant, a hydrosoluble organic solvent, and a fluorine-containing surfactant represented by the following chemical formula 3 or 4:

$$C_6F_{13}-CH_2CH_2O(CH_2CH_2O)_nH \quad (3)$$

Chemical formula 3 where n represents an integer of from 1 to 40, $$C_nF_{2n+1}-CH_2CH(OH)CH_2-O-(CH_2CH_2O)_a-Y \quad (4)$$

Chemical formula 4 where Y represents $C_nF_{2n+1}$ or $CH_2CH(OH)CH_2-C_nF_{2n+1}$, n represents an integer of from 4 to 6, and a represents an integer of from 4 to 14.

2. The inkjet recording method according to claim 1, wherein the quaternary salt of an adduct of alkyl amine.epichlorohydrine has an weight average molecular weight of from 500 to 5,000.

3. The inkjet recording method according to claim 1, wherein the flocculating agent has a solids content of from 20% by weight to 60% by weight.

4. The inkjet recording method according to claim 1, wherein the pre-processing fluid and the aqueous ink satisfy the following relation: Static surface tension of the pre-processing fluid is greater than static surface tension of the aqueous ink at 25° C. with a difference of from 5.0 mN/m to 10 mN/m.

5. An inkjet recording device comprising:
   a container to accommodate a pre-processing fluid;
   a drying device to dry the pre-processing fluid after imparting the pre-processing fluid to a recording medium; and
   an ink container or ink cartridge to accommodate ink for inkjet recording, and
   an inkjet recording head to eject droplets of the ink formed by energy action,
   wherein the pre-processing fluid comprises a hydrosoluble organic solvent, a flocculating agent formed of a quaternary salt of an adduct of alkyl amine.epichlorohydrine represented by the following chemical formula 1, and a nonion-based surfactant represented by the following chemical formula 2, Chemical formula 1

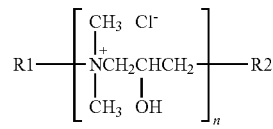

(1)

where R1 and R2 each, independently represent triaryl amine groups or diethylamine groups, and n represents an integer of from 4 to 40, $$R-O-(CH_2CH_2O)x-(CH_2C(CH_3)CH_2O)y-H \quad (2)$$

Chemical formula 2 where x represents 0 or an integer of from 1 to 5, y represents an integer of from 10 to 15, and R represents $C_mH_{2m+1}$, where m represents an integer of from 1 to 20, wherein the aqueous ink comprises a colorant, a hydrosoluble organic solvent, and a fluorine-containing surfactant represented by the following chemical formula 3 or 4:

$$C_6F_{13}-CH_2CH_2O(CH_2CH_2O)_nH \quad (3)$$

Chemical formula 3 where n represents an integer of from 1 to 40, $$C_nF_{2n+1}-CH_2CH(OH)CH_2-O-(CH_2CH_2O)_a-Y \quad (4)$$

Chemical formula 4 where Y represents $C_nF_{2n+1}$ or $CH_2CH(OH)CH_2-C_nF_{2n+1}$, n represents an integer of from 4 to 6, and a represents an integer of from 4 to 14.

* * * * *